US012073719B2

United States Patent
(12) United States Patent
Cross

(10) Patent No.: US 12,073,719 B2
(45) Date of Patent: Aug. 27, 2024

(54) PROTECTED TURNS

(71) Applicant: STC, Inc., McLeansboro, IL (US)

(72) Inventor: Brad Cross, McLeansboro, IL (US)

(73) Assignee: STC, Inc., McLeansboro, IL (US)

(*) Notice: Subject to any disclaimer, the term of this patent is extended or adjusted under 35 U.S.C. 154(b) by 0 days.

(21) Appl. No.: 18/240,756

(22) Filed: Aug. 31, 2023

(65) Prior Publication Data

US 2023/0410648 A1 Dec. 21, 2023

Related U.S. Application Data

(63) Continuation of application No. 17/572,181, filed on Jan. 10, 2022, now Pat. No. 11,756,421, which is a (Continued)

(51) Int. Cl.
*G08G 1/087* (2006.01)
*G08G 1/00* (2006.01)
(Continued)

(52) U.S. Cl.
CPC ............... *G08G 1/087* (2013.01); *G08G 1/20* (2013.01)

(58) Field of Classification Search
None
See application file for complete search history.

(56) References Cited

U.S. PATENT DOCUMENTS

| | | | |
|---|---|---|---|
| 4,321,589 | A | 3/1982 | King |
| 4,914,434 | A | 4/1990 | Morgan et al. |

(Continued)

FOREIGN PATENT DOCUMENTS

| | | | |
|---|---|---|---|
| DE | 19712253 | A1 | 10/1998 |
| DE | 19748173 | A1 | 5/1999 |

(Continued)

OTHER PUBLICATIONS

Applied Information, Inc. Webpage for Digital Media Kit, http://appinfoinc.com/newsroom/digital-media-kit/, printed on Jun. 22, 2018 (7 pages).

(Continued)

*Primary Examiner* — John F Mortell
(74) *Attorney, Agent, or Firm* — Lewis Rice LLC

(57) ABSTRACT

Systems and methods for system for controlling a traffic grid, the system comprising a traffic grid including a first roadway and a second roadway, the second roadway crossing the first roadway at an intersection; a special transit lane included within at least one of the first roadway and the second roadway, the special transit lane being configured to share both personal vehicular traffic and special vehicular traffic; a detector configured to detect the presence of a special vehicle within a detection zone, which detection zone is formed within the special transit lane in a predetermined area proximate to the intersection; and a signal light proximate to the intersection configured to control traffic traveling through the intersection, the signal light having a controller; wherein the controller controls the signal light to operate in a first mode of operation based, at least in part, on a detection of a special vehicle by the detector within the detection zone.

11 Claims, 4 Drawing Sheets

Related U.S. Application Data continuation of application No. 16/810,166, filed on Mar. 5, 2020, now Pat. No. 11,250,700.

(60) Provisional application No. 62/817,921, filed on Mar. 13, 2019.

(51) Int. Cl.
*G08G 1/01* (2006.01)
*G08G 7/02* (2006.01)

(56) References Cited

U.S. PATENT DOCUMENTS

| | | | | |
|---|---|---|---|---|
| 5,539,398 | A | 7/1996 | Hall et al. | |
| 5,610,599 | A | 3/1997 | Nomura et al. | |
| 5,926,113 | A | 7/1999 | Jones et al. | |
| 5,929,787 | A | 7/1999 | Mee et al. | |
| 5,986,575 | A | 11/1999 | Jones et al. | |
| 6,064,319 | A | 5/2000 | Matta | |
| 6,323,307 | B1 | 11/2001 | Bigg et al. | |
| 6,621,420 | B1 | 9/2003 | Poursartip | |
| 7,098,806 | B2 | 8/2006 | Bachelder | |
| 7,116,245 | B1 | 10/2006 | Bachelder | |
| 7,327,280 | B2 | 2/2008 | Bachelder et al. | |
| 7,663,505 | B2 | 2/2010 | Publicover | |
| 7,751,390 | B2 | 7/2010 | Mosko et al. | |
| 7,835,351 | B2 | 11/2010 | Mosko et al. | |
| 7,864,071 | B2 | 1/2011 | Bachelder et al. | |
| 7,868,783 | B2 | 1/2011 | Bachelder | |
| 8,054,202 | B1 | 11/2011 | Sikora et al. | |
| 8,274,404 | B2 | 9/2012 | Sennett et al. | |
| 8,825,350 | B1 | 9/2014 | Robinson | |
| 8,830,085 | B2 | 9/2014 | Edwardson et al. | |
| 8,878,695 | B2 | 11/2014 | Cross | |
| 8,972,159 | B2 | 3/2015 | Ferreira et al. | |
| 9,349,288 | B2 | 5/2016 | Raamot | |
| 9,558,666 | B2 | 1/2017 | Jansson et al. | |
| 9,916,759 | B2 | 3/2018 | Cross | |
| 9,934,685 | B1 | 4/2018 | Bernhardt et al. | |
| 9,953,522 | B2 | 4/2018 | Cross et al. | |
| 10,059,255 | B1 | 8/2018 | Schreiber et al. | |
| 11,202,302 | B2 | 12/2021 | Cross et al. | |
| 2001/0037174 | A1 | 11/2001 | Dickerson | |
| 2002/0065599 | A1 | 5/2002 | Hameleers et al. | |
| 2002/0126022 | A1 | 9/2002 | Ellis | |
| 2006/0261977 | A1 | 11/2006 | Bachelder | |
| 2007/0069920 | A1 | 3/2007 | Hakki et al. | |
| 2009/0256721 | A1 | 10/2009 | Glatfelter | |
| 2010/0141479 | A1* | 6/2010 | Arnold | G01S 13/42 340/936 |
| 2010/0309023 | A1 | 12/2010 | Busch | |
| 2010/0325720 | A1 | 12/2010 | Etchegoyen | |
| 2011/0109478 | A1 | 5/2011 | Williamson et al. | |
| 2011/0187559 | A1 | 8/2011 | Applebaum | |
| 2011/0205086 | A1 | 8/2011 | Lamprecht et al. | |
| 2012/0188099 | A1 | 7/2012 | Lee et al. | |
| 2012/0229303 | A1 | 9/2012 | Loffl et al. | |
| 2012/0326890 | A1 | 12/2012 | Cross | |
| 2012/0326891 | A1 | 12/2012 | Cross | |
| 2013/0018572 | A1 | 1/2013 | Jang | |
| 2013/0048795 | A1* | 2/2013 | Cross | B61L 15/0027 246/122 R |
| 2013/0083722 | A1 | 4/2013 | Bhargava et al. | |
| 2013/0210460 | A1 | 8/2013 | Subramanian et al. | |
| 2014/0185880 | A1 | 7/2014 | Fairfield et al. | |
| 2014/0278029 | A1 | 9/2014 | Tonguz et al. | |
| 2014/0278052 | A1 | 9/2014 | Slavin et al. | |
| 2014/0291454 | A1 | 10/2014 | Cross | |
| 2015/0213713 | A1 | 7/2015 | Taylor | |
| 2015/0243165 | A1 | 8/2015 | Elsheemy | |
| 2016/0163193 | A1 | 6/2016 | Cross | |
| 2016/0189552 | A1* | 6/2016 | Hilleary | G08G 7/02 246/125 |
| 2016/0267787 | A1 | 9/2016 | Whitney et al. | |
| 2016/0292996 | A1 | 10/2016 | Kim et al. | |
| 2016/0379490 | A1 | 12/2016 | Simanowski et al. | |
| 2017/0092126 | A1 | 3/2017 | Oshida et al. | |
| 2017/0116849 | A1 | 4/2017 | Foreman et al. | |
| 2017/0132915 | A1* | 5/2017 | Cross | H04W 4/027 |
| 2017/0148317 | A1 | 5/2017 | Diba | |
| 2017/0337819 | A1 | 11/2017 | Wei et al. | |
| 2018/0096595 | A1 | 4/2018 | Janzen et al. | |
| 2018/0204451 | A1 | 7/2018 | Cross et al. | |
| 2018/0218226 | A1 | 8/2018 | Wellington et al. | |
| 2018/0286228 | A1 | 10/2018 | Xu et al. | |
| 2019/0225145 | A1 | 7/2019 | Sippl | |
| 2019/0384302 | A1 | 12/2019 | Silva et al. | |
| 2019/0385448 | A1 | 12/2019 | Montemurro et al. | |
| 2020/0233072 | A1 | 7/2020 | Osai et al. | |
| 2020/0312132 | A1 | 10/2020 | Cross et al. | |
| 2020/0342760 | A1 | 10/2020 | Vassilovski et al. | |
| 2020/0402397 | A1 | 12/2020 | Yamazaki et al. | |

FOREIGN PATENT DOCUMENTS

| | | | |
|---|---|---|---|
| DE | 19748174 | A1 | 5/1999 |
| EP | 1845503 | A2 | 10/2007 |
| GB | 2312215 | A | 10/1997 |
| JP | 2000011448 | A | 1/2000 |
| JP | 2003516343 | A | 6/2001 |
| JP | 2003051215 | A | 2/2003 |
| JP | 2004030082 | A | 1/2004 |
| JP | 2011186697 | A | 9/2011 |
| JP | 2012003602 | A | 1/2012 |
| JP | 2012155477 | A | 8/2012 |
| JP | 2014224715 | A | 12/2014 |
| JP | 2016110413 | A | 6/2016 |
| JP | 2018500661 | A | 6/2016 |
| KR | 1020060107262 | A | 10/2006 |
| KR | 1020180067471 | A | 6/2018 |

OTHER PUBLICATIONS

International Search Report and Written Opinion in PCT/US2012/044474, mailed Feb. 7, 2013, 9 pages.
International Search Report and Written Opinion in PCT/US2016/057954, mailed Feb. 14, 2017, 9 pages.
International Search Report and Written Opinion in PCT/US2019/022302, mailed Jul. 2, 2019, 10 pages.
International Search Report and Written Opinion in PCT/US2019/055410, mailed Jan. 29, 2020, 7 pages.
International Search Report and Written Opinion in PCT/US2019/066472, mailed Apr. 17, 2020, 12 pages.
International Search Report and Written Opinion in PCT/US2020/021160, mailed Jul. 2, 2020, 10 pages.
International Search Report and Written Opinion in PCT/US2020/067712, mailed Apr. 27, 2021, 7 pages.
Tonguz, Ozan K. "Red Light, Green Light-No Light: Tomorrow's communicative cars could take turns at intersections," IEEE Spectrum, Oct. 2018, pp. 24-29.
TravelSafely Brochure, "Connected Vehicle & Smart City Solutions, The future of connected vehicles is in your hands," Powered by Applied Information, http://appinfoinc.com/wp-content/uploads/2017/12/ts-brochure-1217.pdf, printed on Jun. 22, 2018 (3 pages).
TravelSafely Infographic, "How TravelSafely Works," by Applied Information, http://appinfoinc.com/wp-content/uploads/2017/09/TravelSafely-Infographic.pdf, printed on Jun. 22, 2018 (1 page).

* cited by examiner

PROTECTED TURNS

CROSS-REFERENCE TO RELATED APPLICATIONS

This application is a Continuation of U.S. Utility patent application Ser. No. 17/572,181, filed Jan. 10, 2022, which is a Continuation of U.S. Utility patent application Ser. No. 16/810,166, filed Mar. 5, 2020, issued as U.S. Pat. No. 11,250,700, which claims the benefit of U.S. Provisional Patent Application No. 62/817,921, filed on Mar. 13, 2019. The entire disclosure of all the above documents is herein incorporated by reference.

BACKGROUND

1. Field of the Invention

This disclosure is related to the field of traffic flow management, and more particularly to remotely and/or automatically controlling signal lights to manage dangerous turns in multi-purpose roadways.

2. Description of the Related Art

Traffic intersections are dangerous, and a significant portion of vehicular accidents take place at intersections. To minimize collisions, traffic control systems mediate the flow of traffic. These systems include simple signs, electrical signal lights, uniformed officers using hand signals or flags, and moveable gates which block or allow traffic flow. In most urban and suburban environments, automated, electrically illuminated signal lights (colloquially called "traffic lights") are predominantly used.

With the growth of cities and concerns over the environmental impact of vehicular emissions, commuters increasingly rely on mass transit. Mass transit vehicles include, but are not necessarily limited to, busses and rail vehicles, such as trains, light rail, rapid transit, metro, street cars, trams, and trolleys. Similar concerns have also given rise to higher volumes of light vehicle traffic, such as bicycles and scooters, which have become increasingly prevalent components of commuter traffic in densely populated areas. Increased utilization of light vehicles such as bicycles and scooters can add to the congestion as these types of vehicles typically travel much slower than motor vehicles. Efficient control of the ebb and flow of traffic through efficient and smart signal light control and coordination systems has become increasingly important.

Improved traffic flow in mixed-vehicle environments including mass transit vehicles and bicycles offers substantial benefits. For commuters, reduced commute duration may enhance quality of life. Further, better controls may reduce accidents and save lives. By contrast, poorly coordinated signal lights can cause delays, which can throw mass transit vehicles off-schedule. This may inconvenience riders, reduce confidence in the system, and disincentivize use of mass transit. For example, it has been demonstrated that schedule adherence for mass transit vehicles results in an increase in ridership. Also, improving traffic safety for smaller vehicles, including bicycles, may reduce vehicular congestion and pollution concerns by increasing ridership of human powered vehicles and better moving them through streets.

Currently, a number of different control and coordination systems are utilized to manage traffic flow. These systems usually govern all traffic in the roadway, including mass transit vehicles and bicycles. One mechanism is a traffic controller system, in which the timing of a particular signal light is operated by a traffic controller located inside a cabinet near the signal light. Traffic controller cabinets use "phases" or directions of movement grouped together. For example, a simple four-way intersection may have two phases: North/South and East/West. By contrast, a four-way intersection with independent control for each direction and each left hand turn has eight phases.

While many mass transit vehicles such as buses operate within traditional traffic, it is becoming more and more common for mass transit vehicles to be provided with a designated lane that they use either alone or in conjunction with existing motor vehicle traffic. With light rail trains and trolley cars this is often a necessity as these vehicles are forced to follow preset tracks. However, it is becoming increasingly common that buses and other vehicles also be provided with specific lanes of travel so they can access overhead electric wires, for instance. For space-efficiency and due to many mass transit systems being retrofit on existing roadways, these lanes are often shared with traditional motor vehicle traffic, for example with trolley car tracks simply being laid down the center of one of the existing traffic lanes. It is becoming more common, however, to find special lanes dedicated to mass transit vehicles and generally prohibited from the use by other vehicles.

Existence of such mass transit lanes (or "MTL" as they will be referred to herein) often allows for efficient mass transit systems such as light rail trains or electric busses to be retrofit into existing roads without substantial alteration to existing traffic flow patterns. MTLs are often placed in the middle of an existing street (between the two opposing traffic directions) or in the centermost lanes as there is often space available here to build necessary stations or to run tracks and it can provide certain benefits to better accommodate mass transit vehicle operation. For example, having mass transit in center lanes can allow for efficient stationing as only a single station structure is generally needed (as it can load both directions from the center) and it is often more efficient to have the two opposing directions close to each other for the distribution of electrical power infrastructure. Further, the existence of dedicated center lanes can allow for mass transit vehicles to stop at stations for any length of time without interfering with the desired movement of other vehicles. Further, as mass transit vehicles will rarely, if ever, need to leave their routes, they have essentially no reason to ever need to pull off of the roadway and therefore being forced to remain in the center of the road at all times doesn't prevent them from reaching their destinations.

Designated bicycle lanes provide similar benefits to light vehicles but are often positioned on the outside of existing roadways instead of the center. This positioning is often beneficial as it is easier for such vehicles to enter and leave the street very readily which is very common for such light vehicles. Further, many riders feel more comfortable closer to the outside edge as traffic travelling on this edge will typically travel slower than that in the center. Further, as bicycles and similar vehicles are often slow moving themselves, this positions them where slower moving vehicles would be expected making them more likely to be acknowledged by other vehicle operators.

Because bike lanes and MTLs still generally follow existing roadways (even though they will typically be on opposing edges of them) mass transit vehicles and light vehicles using such lanes are often subject to the same traffic lights as motor vehicle traffic at intersections. This is logical as these lanes are effectively providing motion with the associated vehicular traffic and therefore need to obey similar rules at intersections. It is especially true in retrofit situations. However, because mass transit vehicles and bicycles travel at different speeds and have different locomotive characteristics from vehicular traffic (such as the need to stop at certain points to pick up passengers), it can be difficult to turn these vehicles safely, and they may impede traffic because of their positioning.

For example, a right turn by typical motor vehicle traffic in the United States typically involves turning from the rightmost (outermost) lane so the vehicle never crosses any direction of other traffic. This is why right turning on a red (stop) traffic light is typically allowed. For a bicycle lane (which is the outermost lane in many circumstances) this is easily duplicated, but for an MTL (which is often the innermost lane) this can present a problem as it must cross lanes of traffic travelling in the same direction as itself to turn right. This is a traffic situation which simply does not exist with typical motor vehicle traffic.

Effectively, the problem with turning at intersections with regards to dedicated lanes is that traffic flow has typically not been built on the assumption that vehicles will stay in their lane which is a requirement (sometimes physically and sometimes for safety reasons) for vehicles in a bike lane or MTL. Typical motor vehicle traffic flow presumes that a vehicle will change lanes (from right to left and vice versa) depending on where the vehicle intends to go next. In effect, existing traffic signals at intersections presume that a motor vehicle has previously adjusted into a lane it needs to be in to either go straight, make a right hand turn (right lane), or make a left hand turn (left lane) before reaching the intersection. As traditional motor vehicles are essentially infinitely adjustable in their position on the roadway, this works. However, that infinite adjustment is removed with bicycle lanes and MTLs and is not just replaced by a limited adjustment, but often by not allowing any adjustment at all for safety and mechanical reasons.

This problem has been previously addressed by providing center MTL traffic with an independent signaling system from vehicular traffic signals. To pass through an intersection, mass transit vehicle lights may halt all other traffic flow in all directions to allow a mass transit vehicle to do what needs to be done. This presents a problem that a whole additional signaling infrastructure needs to be built to handle MTLs which substantially increases capital and maintenance costs. Further, even if such signals are provided, they often do not allow a mass transit vehicle in an MTL to have any route other than a single preset one. For example, while a dedicated signal may allow the vehicle to turn right, it can be difficult to have another mass transit vehicle on the same MTL go straight as these can either require different light sequences or require complete shutdown of the intersection to all but the mass transit vehicle to allow for the possibility of either action. This can severely limit the availability of routes and make the mass transit vehicle a less desirable system.

Similar concerns apply to bicycles, but, in many respects, they have it worse. To make a left turn from a right hand bicycle lane, the bicyclist is often forced to stop and actually utilize a pedestrian crossing to cross both portions of the intersection before they can resume travel in a dedicated bicycle lane. This can make left turning for bicycles in an intersection extremely inefficient and potentially dangerous.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is traffic control systems and methods for protected right turns (PRT) and protected left turns (PLT) for vehicles that use designated transit lanes, such as mass transit vehicles in MTLs and light vehicles in bicycle lanes.

Because of these and other problems in the art, there is described herein, among other things, is a system for controlling traffic within a traffic grid, the system comprising: a traffic grid including a first roadway and a second roadway, the second roadway crossing the first roadway at an intersection; a special transit lane included within at least one of the first roadway and the second roadway, the special transit lane being configured to share both personal vehicular traffic and special vehicular traffic; a detector configured to detect the presence of a special vehicle within a detection zone, which detection zone is formed within the special transit lane in a predetermined area proximate to the intersection; and a signal light proximate to the intersection configured to control traffic traveling through the intersection, the signal light having a controller; wherein the controller alters the signal light from a default mode of operation to an alternative mode of operation if the special vehicle is detected by the detector within the detection zone.

In an embodiment of the system, the controller controls the signal light in the default mode of operation when the detector does not detect a special vehicle within the detection zone.

In an embodiment of the system, the special vehicle is a mass transit vehicle such as, but not limited to, a train, tram, trolley, or bus.

In an embodiment of the system, the special vehicle is a light vehicle such as, but not limited to, a bicycle.

In an embodiment, the system further comprises a database including at least one predetermined schedule for the special vehicle, and wherein the controller additionally controls the signal light to operate in the default mode of operation or in the alternate mode of operation based on the at least one predetermined schedule of the special vehicle.

In an embodiment, the system further comprises a VCU within the special vehicle; and wherein the special vehicle is detected by the detector within the detection zone by detection of the VCU within the detection zone.

There is also described herein, in an embodiment, a system for controlling traffic within a traffic grid, the system comprising: a traffic grid including a first roadway and a second roadway, the second roadway crossing the first roadway at an intersection; a special transit lane included within at least one of the first roadway and the second roadway, the special transit lane being configured solely for special vehicular traffic; a detector configured to detect the presence of a special vehicle within a detection zone, which detection zone is formed within the special transit lane in a predetermined area proximate to the intersection; and a signal light proximate to the intersection configured to control traffic traveling through the intersection, the signal light having a controller; wherein the controller alters the signal light from a default mode of operation to an alternative mode of operation if the special vehicle is detected by the detector within the detection zone.

In an embodiment of the system, the controller controls the signal light in the default mode of operation when the detector does not detect a special vehicle within the detection zone.

In an embodiment of the system, the special vehicle is a mass transit vehicle such as, but not limited to, a train, tram, trolley, or bus.

In an embodiment of the system, the special vehicle is a light vehicle such as, but not limited to, a bicycle.

In an embodiment, the system further comprises a database including at least one predetermined schedule for the special vehicle, and wherein the controller additionally controls the signal light to operate in the default mode of operation or in the alternate mode of operation based on the at least one predetermined schedule of the special vehicle.

In an embodiment, the system further comprises a VCU within the special vehicle; and wherein the special vehicle is detected by the detector within the detection zone by detection of the VCU within the detection zone.

There is also described herein, in an embodiment, a method for controlling a traffic grid, the method comprising: providing a traffic grid including a first roadway and a second roadway, the second roadway crossing the first roadway at an intersection; providing a special transit lane included within at least one of the first roadway and the second roadway, the special transit lane being configured to share both personal vehicular traffic and special vehicular traffic; providing a detector configured to detect the presence of a special vehicle within a detection zone, which detection zone is formed within the special transit lane in a predetermined area proximate to the intersection; and providing a signal light proximate to the intersection configured to control traffic traveling through the intersection, the signal light having a controller; wherein the controller controls a mode of operation of the signal light based, at least in part, on a detection of a special vehicle by the detector within the detection zone.

In an embodiment of the method, the controller utilizes a default mode of operation when the detector does not detect a special vehicle within the detection zone.

In an embodiment of the method, the control utilizes an alternative mode of operation when the detector does detect a special vehicle within the detection zone.

In an embodiment of the method, the special vehicle is a mass transit vehicle such as, but not limited to, a train, tram, trolley, or bus.

In an embodiment of the method, the special vehicle is a light vehicle such as, but not limited to, a bicycle.

In an embodiment, the method further comprises a database including at least one predetermined schedule for the one special vehicle, and wherein the controller additionally controls the signal light to change the mode of operation based, at least in part, on the at least one predetermined schedule of the special vehicle.

In an embodiment, the system further comprises a VCU within the special vehicle; and wherein the special vehicle is detected by the detector within the detection zone by detection of the VCU within the detection zone.

BRIEF DESCRIPTION OF THE DRAWINGS

In FIG. 1, mass transit vehicles have only a single option of passage through the intersection which is to make a right hand turn.

In FIG. 3, mass transit vehicles have multiple options of passage through the intersection.

In FIG. 4, mass transit vehicles have only a single option of passage through the intersection which is to make a right hand turn.

DESCRIPTION OF THE PREFERRED EMBODIMENT(S)

Figure 1:
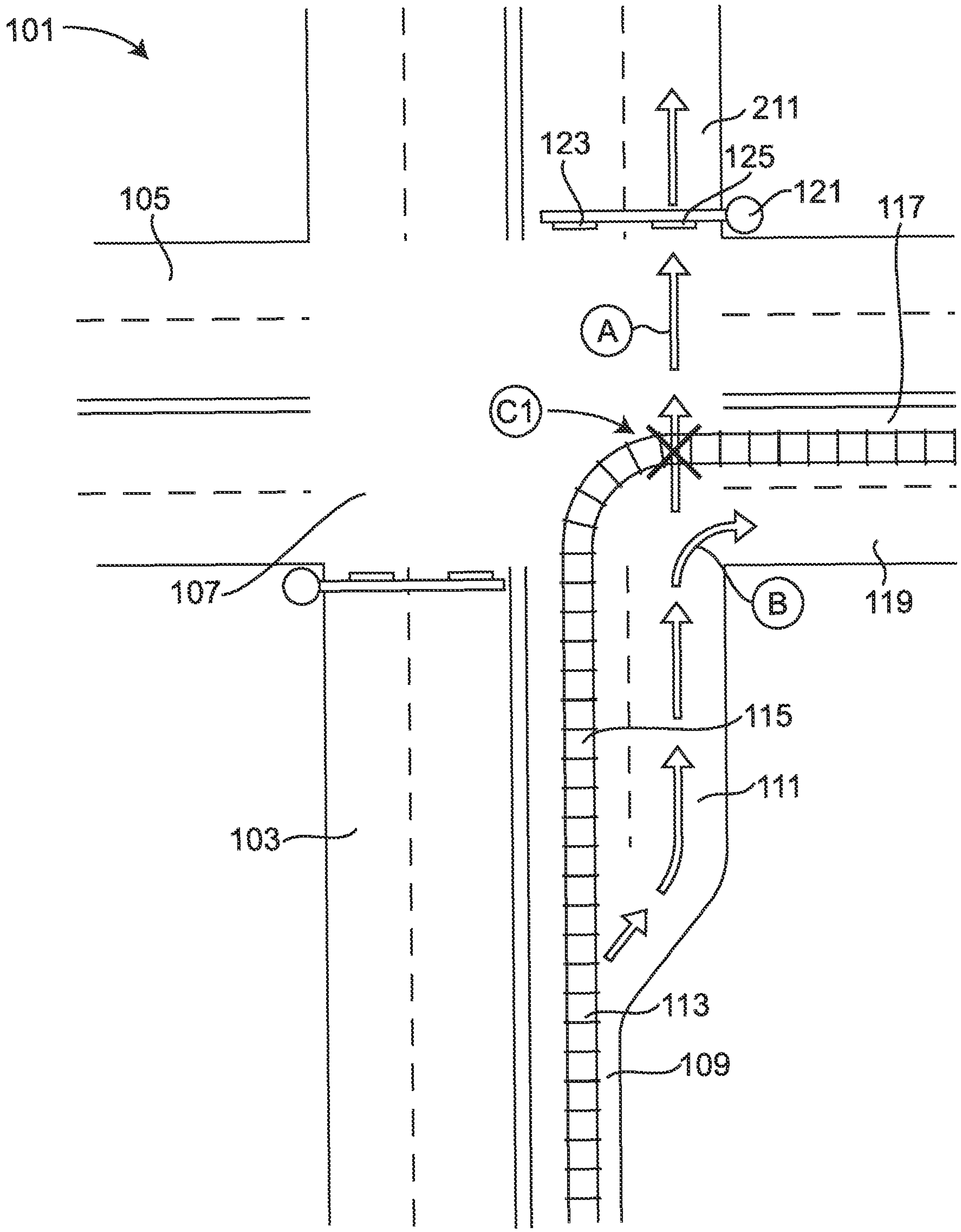
FIG. 1 provides a top-down diagram view of an embodiment of a traffic control system and method for protected turns for an intersection having a mixed-use mass transit lane and a traditional vehicle lane.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matters contained in the description or shown in the accompanying drawings shall be interpreted as illustrative and not in a limiting sense.

As a preliminary matter, it should be noted that while the description of various embodiments of the disclosed system will discuss the movement of mass transit vehicles and bicycles through signal lights, this in no way limits the application of the disclosed traffic control system to use by any specific type of mass transit vehicle, bicycle, or other vehicle. Any vehicle which could benefit from the use of a PRT system or PLT system due to it using a dedicated lane (for example, a street cleaner cleaning an MTL or a dedicated "car pool" lane) is contemplated.

In a broad sense, the PLT and PRT systems use zone control technology to allow mass transit vehicles and bicycles to proceed along with the regular flow of traffic, while allowing these types of vehicles, small and large, to make turns with a reduced impact on regular traffic flow. These goals are accomplished through use of zone detection reading, computer software and applications, and radio communication as described herein which serves to identify that a vehicle (light or mass transit) has arrived at an intersection, what its route is intended to be through the intersection, and how best to engage traffic lights (general to all traffic at the intersection and/or specific to vehicles in a bicycle lane or MTL) to allow that vehicle to proceed with minimal disruption to its schedule and the flow of other traffic.

A number of techniques may be used to detect the presence of a vehicle. As described elsewhere herein, detection may be done by use of a vehicle computer unit (VCU) or personal mobile device acting as a VCU. Techniques and designs of VCUs are described in various prior patents and patent applications, including U.S. Pat. Nos. 8,878,695, 8,773,282, 9,330,566 and 9,916,759, and U.S. Prov. Pat. App. Ser. No. 62/743,281, the entire disclosures of all of which are incorporated herein by reference.

VCUs generally contain receivers that include satellite positioning navigation system. Generally, any satellite positioning system known to one of ordinary skill in the art is contemplated including, but not limited to, the Global Positioning System (GPS), the Russian Global Navigation Satellite System (GLONASS), the Chinese Compass navigation system, and the European Union's Galileo positioning system. Further, any receiver technology known to those of skill in the art that is able to calculate position is suitable for use in the disclosed system.

The installation of the VCU can either be permanent, by direct integration into the vehicle, or temporary, such as a mobile smart phone or receiver that can be taken into and removed from the vehicle. Generally, the receiver of the VCU functions to determine the vehicle's position, direction and velocity in real time at any given point during its travels. In alternative embodiments, it is contemplated that the VCU will determine its position, direction, and velocity through internal navigation systems known to those of ordinary skill in the art alternatively or in addition to through satellite positioning driven systems. Contemplated internal navigations systems include, but are not limited to, gyroscopic instruments, wheel rotation devices, accelerometers, and radio navigation systems. For light vehicles, such as bicycles and scooters, a positioning transceiver may be built into the vehicle, or carried by the rider (e.g., a mobile phone).

The VCU is generally operated by software programmed to transfer location data, coordinates, and detected speed of the vehicle to a remote traffic control centers or detector(s) disposed at an intersection or signal light. Another component may be a radio transceiver. Generally, any device for the transmission and receiving of radio signals including but not limited to the FHSS and/or FHCDMA methods of transmitting radio signals is contemplated. Alternatively, a wireless networking protocol, such as a protocol in the IEEE 802 families of protocols, may be used.

Throughout this disclosure, the term "computer" is used to describe hardware which implements functionality of various systems. The term "computer" is not intended to be limited to any type of computing device but is intended to be inclusive of all computational devices including, but not limited to, processing devices or processors, personal computers, work stations, servers, clients, portable computers, and hand held computers. Further, each computer discussed herein is necessarily an abstraction of a single machine. It is known to those of ordinary skill in the art that the functionality of any single computer may be spread across a number of individual machines. Therefore, a computer, as used herein, can refer both to a single standalone machine, or to a number of integrated (e.g., networked) machines which work together to perform the actions. In this way, the functionality of the vehicle computer may be at a single computer, or may be a network whereby the functions are distributed. Further, generally any wireless methodology for transferring the location data created by the vehicle equipment unit to either the remote control center (in the centralized embodiment) or particular priority detectors is contemplated in this disclosure. Contemplated wireless technologies include, but are not limited to, telemetry control, radio frequency communication, microwave communication, GPS, and infrared short-range communication.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced as where each machine is capable of performing most or all functions of any other machine and is assigned tasks based on its available resources at a point in time. Thus the term "computer" as used herein, can refer to a single, standalone, self-contained device or to a plurality of machines working together or independently, including without limitation: a network server, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing in the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

In this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation into a microchip, and still be considered "software" within the meaning of this disclosure. For purposes of this disclosure, software includes without limitation: instructions stored or storable in RAM, ROM, flash memory, BIOS, CMOS, mother and daughter board circuitry, hardware controllers, USB controllers or hosts, peripheral devices and controllers, video cards, audio controllers, network cards Bluetooth® and other wireless communication devices, virtual memory, storage devices and associated controllers, firmware, and device drivers. The systems and methods described here are contemplated to use computers and computer software typically stored in a computer-or-machine-readable storage medium or memory.

Throughout this disclosure, terms used herein to describe or reference media-holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally memory refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms “server” and “client” may refer to endpoints of a network communication or network connection, including but not necessarily limited to a network socket connection. Those having ordinary skill in the art will further appreciate that a “server” may comprise a plurality of software and/or hardware servers delivering a service or set of services. Those having ordinary skill in the art will further appreciate that the term “host” may, in noun form, refer to an endpoint of a network communication or network (e.g., “a remote host”), or may, in verb form, refer to a server providing a service over a network (“hosts a website”), or an access point for a service over a network.

Throughout this disclosure, the term “real time” refers to software operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that “real time” does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is a graphical user interface, “real time” normally implies a response time of no more than one second of actual time, with milliseconds or microseconds being preferable. However, those of ordinary skill in the art also understand that, under other operational contexts, a system operating in “real time” may exhibit delays longer than one second, particularly where network operations are involved.

Throughout this disclosure, the term “transmitter” refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term “receiver” refers to equipment, or a set of equipment, having the hardware, circuitry, and/or software to receive such transmitted electromagnetic waves and convert them into signals, usually electrical, from which the message, signal, data, or other information may be extracted. The term “transceiver” generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term “transmitter” should be understood to imply the presence of a receiver, and the term “receiver” should be understood to imply the presence of a transmitter.

An embodiment of the systems and methods described herein is depicted in FIG. 1. As depicted in FIG. 1, a traffic grid (101) comprises a first roadway (103) and a second roadway (105) meeting at an intersection (107). The depicted traffic grid (101) is a United States-style grid in which forward traffic travels in the right-hand lanes, but this could be readily reversed as would be understood by one of ordinary skill in the art. In the depicted embodiment of FIG. 1, a mass transit lane or MTL (109) is shown, which is a shared lane for vehicular traffic and a mass transit vehicle. Throughout the FIGS, the route and location of a mass transit vehicle will always be depicted as an indication of train tracks. This is not to require that the mass transit vehicle be a train, but it is a good way to show that a mass transit vehicle will typically always follow a limited number of possible paths or routes as this is the typical behavior of mass transit vehicles as they have defined routes and schedules. Further, systems such as these are particularly valuable for mass transit vehicles such as light rail trains or trolleys as these will regularly travel down the middle of roads.

As the MTL (109) in FIG. 1 approaches the intersection (107), a new outside motor vehicle lane (111) branches off which continues on the other side of the intersection (211) where the road is now wider. The outside lane (111) also facilitates vehicular right-hand turns onto the second roadway (105) as the outside lane (111) allows for traffic to go straight or to turn right onto roadway (105). In the MTL (109), motor vehicle traffic could either turn left onto roadway (105) or can proceed straight through the intersection (107).

The rail line (113) indicates that a mass transit vehicle in the MTL (109) will need to turn right in intersection (107). However, the rail line (113) needs to turn right from the inside MTL (115) into the inside MTL (117) of the second roadway (105). There is no problem with such a right turn for traffic turning right from lane (111) as this traffic will simply turn right inside the rail line (113) turn presenting no hazard and vehicular traffic turning right should move into the right-hand lane (111) and turn directly into the right-hand lane (119) of the second roadway (105). Rail traffic will follow the rail line (113) from the left MTL (115) into the left lane (117) of the second roadway (105).

However, a major problem arises for the rest of the traffic on roadway (103). Firstly, one must recognize that as a mixed lane, the MTL (109) needs to allow for traffic ahead and behind the mass transit vehicle to go left and/or straight. None of this traffic will turn right due to the existence of lane (111), but the mass transit vehicle in the MTL (109) needs to turn right and will only turn right making it's movement through the intersection different from that of every other vehicle in the MTL (117). Further, in order for the mass transit vehicle to turn right, traffic ahead of the mass transit vehicle has to be allowed to get out of the way to allow the mass transit vehicle to enter the intersection (107) at all. Further, when motor vehicle traffic in the right-hand lane (111) intends to proceed straight through the intersection as shown in FIG. 1 as route A, there is the potential for a collision (C1) if a mass transit vehicle on the rail line (113) is in the process of making a right-hand turn. This is because the right-hand turn of the rail line (113) crosses the path of a vehicle on route A.

Now one way to resolve this problem is simply to not allow traffic from lane (111) to proceed straight through the intersection. In this case, there is no collision risk as all traffic from lane (111) will have to turn right. However, as the road widened at this point, vehicle traffic proceeding past the intersection (107) is presented with a much wider road. Thus, it is highly possible, particularly in a congested area, that not allowing lane (111) to proceed straight will result in a bottleneck forming at intersection (107) as vehicles cannot get through the intersection (107) fast enough. Further, should lane (111) not have pulled off as shown here, but have simply always been present, that is not an option without also bottlenecking the intersection (107) due to a loss of lane which now has to become a right turn only lane for no reason other than the need of a mass transit vehicle (which may not even be present the vast majority of the time) to be able to turn right.

The danger of this type of intersection arrangement is not so much the mechanical positioning as to how to signal traffic flow for efficient and safe passage. Effectively, traffic which is not the mass transit vehicle in lane (109) needs to be signaled when to proceed straight or go left. Further, when a mass transit vehicle is not present at the intersection (107) it is safe to freely signal traffic in lane (111) to proceed straight or go right. Further, most of the time it will be the case that there will not be a mass transit vehicle at the intersection (107) when the lights change.

Figure 4:
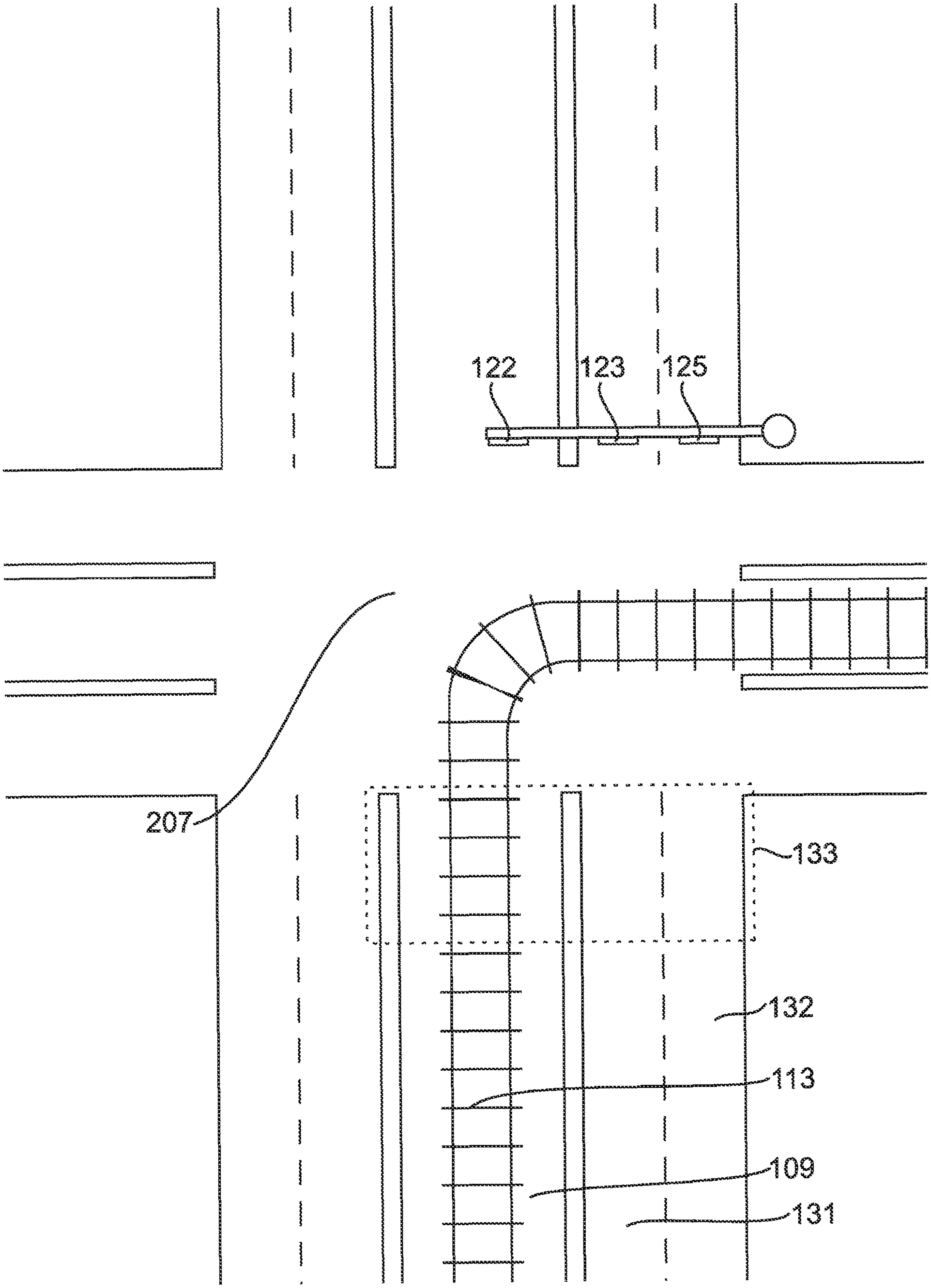
FIG. 4 provides a top-down diagram view of an embodiment of a traffic control system and method for protected turns for an intersection having a single-use mass transit lane and two traditional vehicle lanes.

However, should the mass transit vehicle be present, the lights (123) either need to change to specify which lane can do what instead of presenting the indication in synchronicity for the entire intersection (a situation which is confusing compared to standard intersection signals in the US which jointly indicate passage for all lanes), or the mass transit vehicle needs to sit and wait for a safe time to turn right. This both results in it blocking traffic (and vehicles going around it in lane (111) making it even harder to turn) and a dangerous situation as the mass transit vehicle tends to turn slowly. FIG. 4 shows that there is a similar problem to FIG. 1 when the MTL (109) lane is dedicated to only mass transit traffic and that this does not solve the problem.

Figure 2:
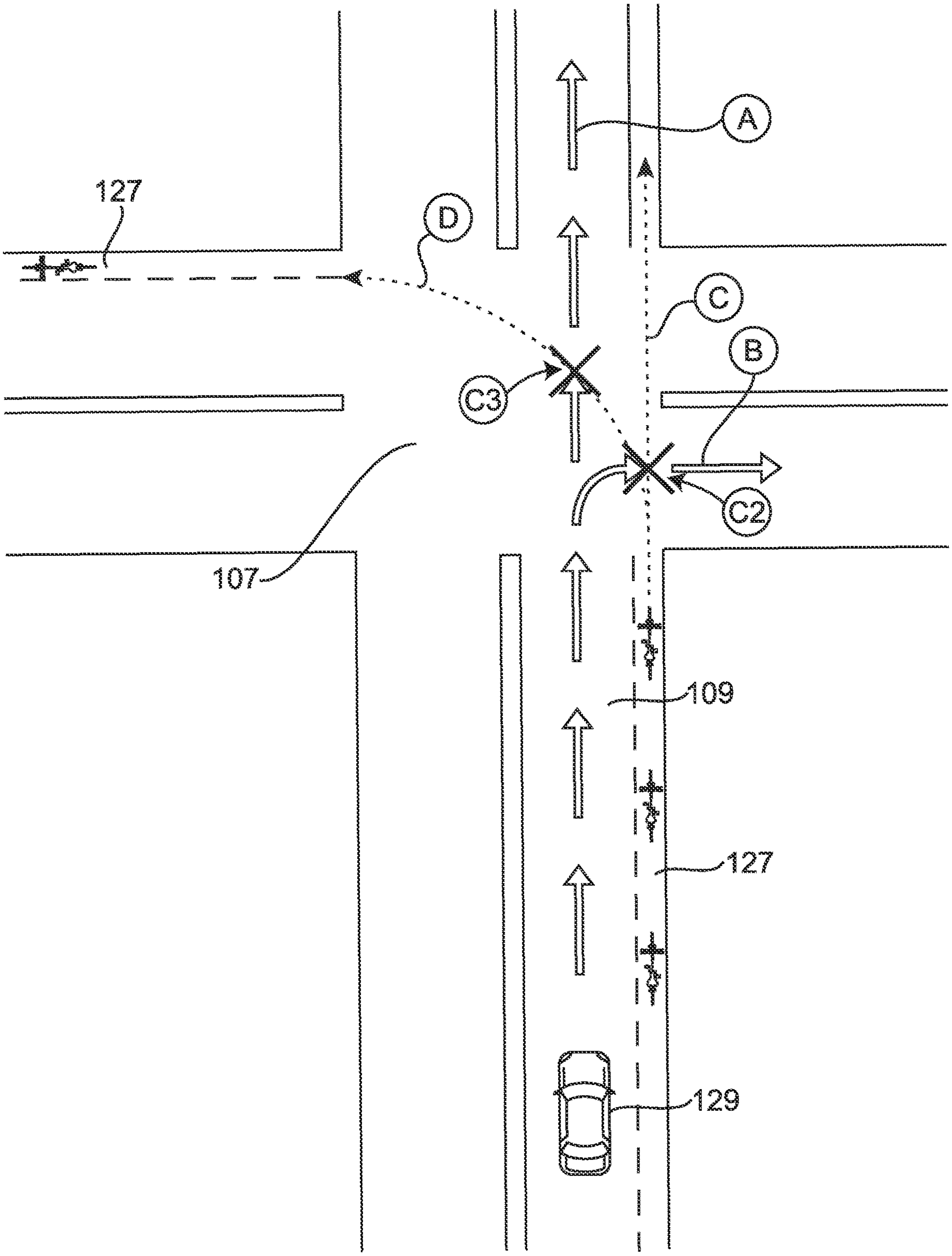
FIG. 2 provides a top-down diagram view of an embodiment of a traffic control system and method for protected turns for an intersection having a light vehicle lane and a traditional vehicle lane.

A similar collision risk is shown in FIG. 2. In FIG. 2, a vehicular lane (109) is shown with a dedicated light vehicle lane (127) adjacent thereto. The depicted light vehicle lane (127) is disposed on the outside side of the vehicular lane (109). As each lane (109) and (127) approaches the intersection (107), there are two major risks of collision. First, if a cyclist or rider in the light vehicle lane (127) wishes to proceed straight on route C but a vehicle (129) in the vehicular lane (127) desires to turn right on route B, the vehicle (129) must cross the path of any light vehicles in the light vehicle lane (127) proceeding straight on route C creating a collision point (C2). Conversely, if a vehicle (129) in the vehicular lane (109) is proceeding straight on route A, but a light vehicle in the light vehicle lane (127) is turning left on route D, there is a risk of collision (C3).

Figure 3:
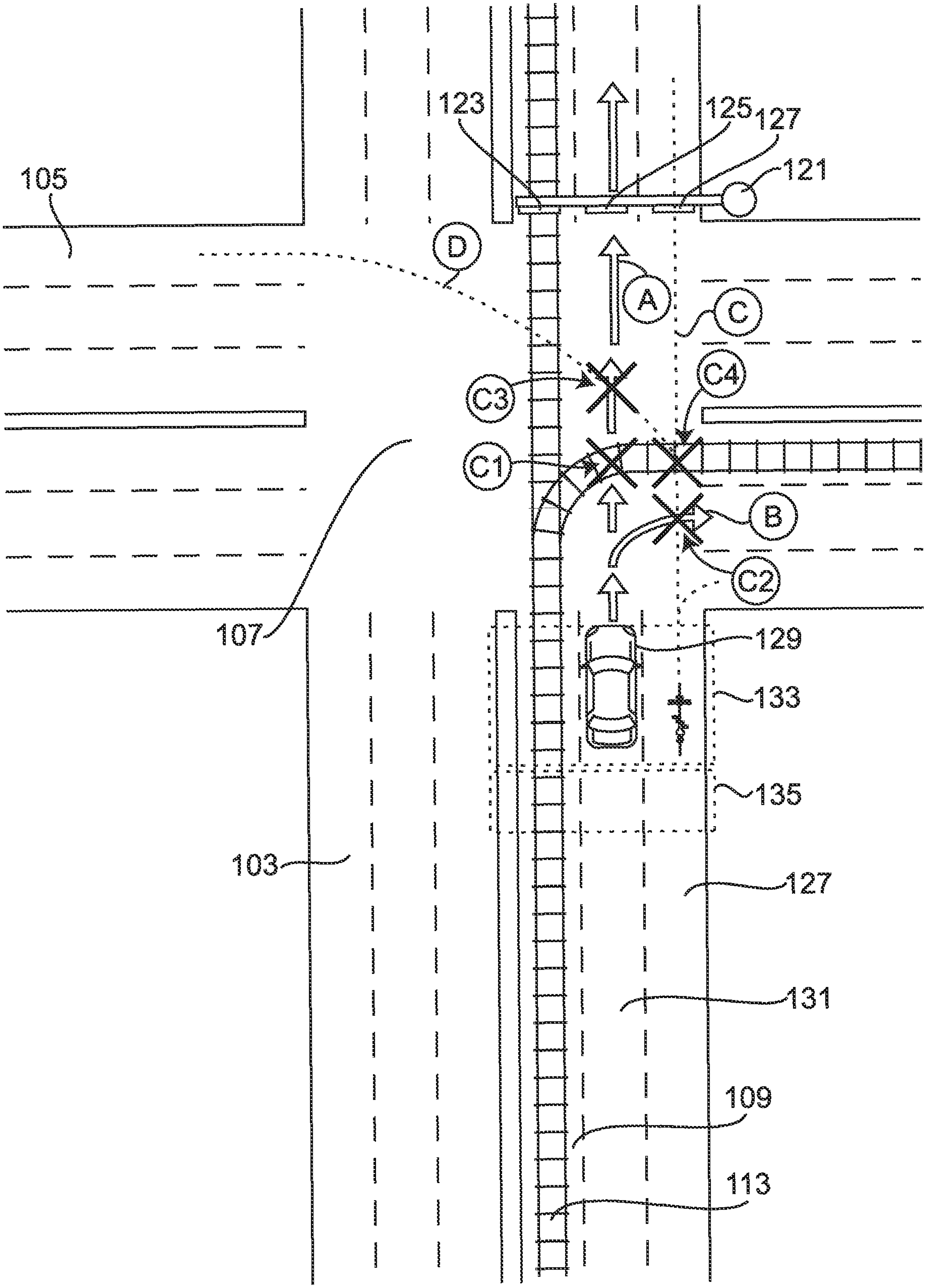
FIG. 3 provides a top-down diagram view of an embodiment of a traffic control system and method for protected turns for an intersection having both a light vehicle lane and a mixed-use mass transit lane.

FIG. 3 shows yet another form of problematic intersection. This one is much more complicated as it involves both an MTL (109) and a light vehicle lane (123) and a mass transit vehicle in the MTL (109) may turn or go straight depending on its route.

All the above create problems because the special purpose nature of the lanes requires turns to be made across other traffic. If both lanes (109) and (127) were simply vehicular lanes, traffic in the right-hand lane (127) would simply not have the right-of-way to make a left-hand turn. Instead, the traffic would move to the left-hand lane (129) to make such a turn, reducing the risk of collision. However, with MTLs and light vehicle lanes, the special use nature of the lane makes this option unsafe. That is, it is dangerous for light vehicles in the light vehicle lane (127) to first merge left into the vehicular lane (109), make a left turn, and then return to the light vehicle lane (127) on the cross street.

The systems and methods described herein detect the presence of a special purpose vehicle, generally a mass transit vehicle or a light vehicle of any type which typically are provided with specific lanes for their use at the inside and/or outside of a roadway, and control applicable signal lights appropriately to reduce or minimize the risk of collision by determining how to pattern the lights based on the presence (or lack thereof) of a special purpose vehicle in a particular lane at the intersection when passage through the intersection is transitioning.

This can be best seen in the embodiment depicted in FIG. 3 which provides for a large number of possible issues between different vehicles in different lanes. In FIG. 3, an intersection (107) is formed by the crossing of a first roadway (103) and a second roadway (105). The depicted first roadway (103) comprises three different commuting lanes: a mixed MTL (109) (with both a dedicated mass transit rail line and allowing other vehicle traffic), a vehicular traffic lane (131) and a light vehicle lane (127). As is common in urban designs, the light vehicle lane (127) is the outermost lane, and the MTL (109) is the innermost lane. As depicted, there are four different collision opportunities. First, a vehicle (129) proceeding straight on route (A) may collide with a right-turning mass transit vehicle at collision point (C1), or may collide with a left-turning light vehicle at collision point (C3). Also, a vehicle (129) turning right on route (B) may collide with a light vehicle proceeding straight on route (C) at collision point (C2). Finally, a light vehicle proceeding straight on route (C), or turning left on route (D), may collide at collision point (C4) with a right-turning mass transit vehicle.

The systems and methods described herein make use of a detection zone (133) disposed at or prior to the intersection (107) to detect the approach of a monitored vehicle, such as a mass transit vehicle in the MTL (109), or a light vehicle in the light vehicle lane (127). This detection may be performed by use of a vehicle computer unit (VCU), or an alternative such as a mobile device, as contemplated elsewhere. This detection may done, for example, by defining the detection zone, monitoring the locational coordinates of monitored vehicles via the VCU or personal device, detecting when a monitored vehicle has entered the detection zone (133), and operating the traffic control signals as needed to facilitate safe mass transit vehicles.

A number of techniques may be used to detect the presence of a vehicle. As described elsewhere herein, detection may be done by use of a VCU or personal mobile device. These techniques are described in various prior patents and patent applications, including U.S. Pat. Nos. 8,878,695, 8,773,282, 9,330,566 and 9,916,759, and U.S. Prov. Pat. App. Ser. No. 62/743,281, filed Oct. 9, 2018, the entire disclosures of which are incorporated herein by reference. Detecting light vehicles can be more difficult but systems and methods for doing so are contemplated in, for example, U.S. Pat. No. 9,953,522 and U.S. patent application Ser. No. 15/921,443 the entire disclosures of which are herein incorporated by reference. Other techniques can be used for detection. For purposes of this disclosure, it should be recognized that the element of detection is met simply by determining that there is a special purpose vehicle in lane (109) and/or lane (127) in detection zone (133) and that the special purpose vehicle may or will need to interact with the intersection in a way which presents at least one of the potential four collision risks (C1), (C2), (C3), or (C4).

In an embodiment, the traffic lights are controlled based not only the detection of a vehicle, but based upon a vehicle's schedule, route, or intended direction of travel. Particularly for mass transit vehicles, which typically operate on a set schedule and generally have a fixed route, it may be known in advance whether the vehicle will proceed straight through the intersection or turn. For example, in FIGS. 1 and 4, a train on the tracks (113) has no option but to make a right turn, therefore any mass transit vehicle on the tracks (113) will make a right turn. However, in FIG. 3, this is not a given and whether the mass transit vehicle goes straight through the intersection (107) or turns right will generally depend on what its proscribed route is. Similarly, a light vehicle in lane (127) of FIG. 2 or FIG. 3 can turn in either direction or go straight. For an MTL the route information is often fixed either to the vehicle (e.g. by what type of vehicle it is or who it is identified) or may be fixed based on the time that the vehicle is approaching the intersection.

It is important to recognize that for many mass transit vehicles at an intersection (107) it is generally readily determinable if the vehicle will go straight or turn even when both are an option. For example, buses and trains are generally assigned to fixed routes and schedules and that route needs to be publically displayed prominently on the vehicle so passengers get on the correct vehicle and not an unintended one at a prior station and vehicles on particular routes are typically in specific places based on a schedule. Thus, a mass transit vehicle displaying that it will take route A (which happens to go straight) should proceed straight at intersection (107) while a similar vehicle (or even the same vehicle at a different time) displaying that it will take route B (which requires a right-hand turn) should make a right hand turn at intersection (107). Similarly, if the vehicle on route A typically is at the intersection at 11:15 while the vehicle on route B is there at 11:45, a vehicle at intersection (107) at 11:18 is likely on route A and will go straight.

Information related to the routes of mass transit vehicles may be stored in a database, which may be remote in a traffic control center, or onboard the mass transit vehicle in question. This information may be associated with a unique identifier for the mass transit vehicle, and that unique identifier may be transmitted to a traffic controller or traffic control center along with the updated locational coordinates for the mass transit vehicle as part of the operation of a VCU. Thus, as a given vehicle approaches an intersection, the vehicle's unique identifier and location are transmitted, and if the vehicle is detected in the detection zone, the schedule can be consulted to determine whether that vehicle is expected to proceed straight through the intersection, or make a turn. Alternatively, the driver of the mass transit vehicle may indicate via the vehicle controls or other transmissions which direction the vehicle intends to go. For example, for rail travel, a switch must be thrown to divert the vehicle from one set of tracks to another. When that request is made, it is known which direction the vehicle will go. Still further, the route may be inferred based on the timing of the vehicle at the intersection.

After a monitored vehicle is detected, a signal light operational decision must be made to either confirm that the current or proposed immediately following state of the signal light is appropriate to facilitate the anticipated flow of traffic, or begin to change the signal lights to facilitate such safe flow of traffic. This is generally done by temporarily stopping key lanes of traffic and will typically be done by altering the flow of all traffic originally approaching the intersection from the same direction in the same way. In this way, there is no need to control individual lanes differently which can be confusing to vehicle drivers not used to such arrangements.

For example, in the depicted embodiment of FIG. 3, if a light rail vehicle, car, and light vehicle, all approach the intersection simultaneously, the car is the least likely to be detected (and is assumed to not be detected). This is because a driver of a private car is unlikely to have a VCU or to have a mobile device configured for use with the system described herein. Further, vehicular traffic flow is in most instances the default that is desired not to be disrupted. If there is no detection of a specialized vehicle in either lane (109) or (127), there is no need to do anything and the lights operate normally generally simply turning green to allow straight ahead, right turn, and a left turn yield (to oncoming traffic) for traffic flow.

However, at some time a mass transit vehicle and/or a light vehicle will be detected in detection zone (133) when there is a vehicle (129) in lane (131). For purposes of simplicity of this immediate example, the light (121) at the start of this example is assumed to be red to all lanes and the present traffic going upward on the page is next to move. Further, this first example provides that light (123) provides a solid (disc) green, yellow, and red option along with a green and yellow left arrow, light (125) provides only solid green, yellow, and red, and light (127) provides a specialized green and red right arrow which also has the option of simply being off (no display). Thus, the three lights (123), (125) and (127) effectively work synchronously to coordinate the flow of all lanes.

In the first instance, it makes sense to look at what is potentially the most problematic scenario. Specifically, a mass transit vehicle in lane (109) needs to go right, the car (129) is to go straight, and a light vehicle in lane (127) needs to go left. This effectively triggers potential collisions (C1), (C3) and (C4). In this scenario, the light (127) can initially be set to a right green arrow with lights (123) and (125) showing red discs. This is an indicator allowing right turns only. This will allow the mass transit vehicle to safely turn and be out of the way. Note that even though the mass transit vehicle is turning from the left lane, the signal pattern of the lights (123), (125) and (127) allows right turns, so this is acceptable.

Next, the light (127) can go from green right arrow to red right arrow and the light (123) can go to green left arrow and red disc with the light (125) remaining on red disc. This allows for the light vehicle to safely turn left and be out of the way. Finally, the light (123) can turn the left arrow flashing yellow and green disc, the light (125) turns to a green disc and light (123) turns off. This allows car (129) to proceed without any collision risk and for any cars behind the mass transit vehicle in lane (109) or behind car (129) to proceed how they wish.

It should be apparent that such a scenario works even if it is unknown which direction the mass transit vehicle or the light vehicle are to turn (or even if the vehicle (129) was able to turn right and/or left) from its lane as the vehicles cannot turn into each other in any way. Further, it also works if there are right turning vehicles also in the light vehicle lane (129) in any order as they can either turn right with the right green arrow or the green disk without concern of collision. Given that the potential collision scenarios can all be avoided without knowledge of where the vehicles are going and which ones are at the intersection, it should be apparent that a light pattern involving an ordered combination of green right and left arrows along with a straight green can be used to clear the intersection. Further, the only vehicle likely to be stuck at this intersection (107) for any length of time would be a light vehicle turning left which is behind a light vehicle going straight. However, light vehicles such as bicycles can readily go around each other within a lane, it is expected that such a vehicle would simply go around the light vehicle waiting when the light turned to green left arrow.

An important element to note, however, is that the three ordered pattern above takes time to implement, which is not always desired if there is not traffic turning or presenting a collision risk because it is not there. It would not be surprising for each of the two arrow sequences to take 30 seconds to implement meaning that there could be a minute of wasted time for vehicle (129) if there are no specialty vehicles present at the intersection. Thus, should one or both of the arrows be determined to not be necessary because no vehicle is detected which could need that arrow or which does need that arrow, it can be eliminated from the pattern. Thus, for example if only vehicles were detected in both lanes (129) and (109) with a mass transit vehicle in lane (109) going straight, the light (123) could simply go from red to solid green with a yellow flashing arrow for left and light (125) go to a green disk with light (127) remaining off. This eliminates the need for motor vehicles to sit through the left and right arrow sequence with no vehicles moving, which may be upsetting to those waiting.

In FIG. 3, the operation may be further refined through the use of a more upstream placed detection zone (135) prior to detection zone (133). This can allow for detection of a mass transit vehicle which is behind other traffic which needs to be dealt with. For example, if the mass transit vehicle is stopped in zone (135) but has not entered zone (133) and needs to make a right turn, it is likely that there is another vehicle in lane (109) ahead of it which wishes to either go straight or turn left. In this instance, it is necessary to clear these vehicles before the mass transit vehicle can make its turn. This can alter the pattern of the lights (123), (125) and (127) from that contemplated above. For example, as discussed above, one possible pattern when the mass transit vehicle is in zone (133) is right arrow, left arrow, straight. If the mass transit vehicle is stopped in zone (135), implying vehicles in lane (109) ahead of it in zone (133), this pattern will not work as the mass transit vehicle is unable to turn right yet, and the mass transit vehicle would instead have to stop at the intersection once it entered zone (133) blocking traffic.

In this scenario, the straight indication (with flashing yellow arrow) may be provided first. This acts to clear all the vehicles in lane (109) ahead of the mass transit vehicle. Once the mass transit vehicle is in zone (133), the light may then turn to red for straight and left turn and turn green for right arrow. This allows the mass transit vehicle to clear the intersection. Further, the relative size and shape of the zones (133) and (135) can be set so that this transition is not overly quick (the straight green does not seem overly short). In a still further, embodiment, to prevent a scenario where a mass transit vehicle is behind a small amount of other traffic which could result in an overly short green, the lights may be arranged to turn red on the prior intersection transition in a way that forces the mass transit vehicle to stop in zone (133) as the front vehicle at the prior transition.

It should be recognized that while the above contemplates all of the signals (123), (125) and (127) operating in synchrony and showing universally how the lanes are to move instead of each being for a specific lane, it is possible in an alternative embodiment to have a separate signal light (123) for the MTL (109), a second signal light (125) for the vehicular lane (131), and a light vehicle signal light (127) for the light vehicle lane which control each lane independently.

In this illustrative example, a number of different control signal decisions could be made. For example, if it is determined that the rail vehicle in the MTL (109) should have the right-of-way (e.g., to make a right turn across traffic), then signal light (123) would remain green, but signal lights (125) and (127) would turn red, preventing vehicular traffic in the vehicle lane (131) and light vehicle traffic in the light vehicle lane (127) from proceeding through the intersection. However, either lane (131) or (127) could still safely turn right. Thus, if the signal lights (125) and (127) have right turn indicators, they could be green, allowing for safe right turns in all three lanes. Similarly, it should go without saying that cross traffic on the second roadway (105) should be stopped to prevent collisions with those vehicles turning right from the first roadway (103) onto the second roadway (105). However, right turns in the counter flow phase on the first roadway (103) could be allowed.

Alternatively, a decision may be made instead to stop the mass transit vehicle in the MTL (109), and stop light vehicle traffic in the light vehicle lane (127), and allow vehicular traffic to proceed in the vehicle lane (131). In such an example, signal lights (123) and (125) may be turned red, allowing vehicles in lane (131) to either proceed straight on route A or safely turn right on route B, without risk of colliding with a light vehicle at collision point C2.

Alternatively, signal light (125) could indicate that forward traffic on route A is permitted, but right turns on route B are not, allowing light traffic in lane (127) to proceed safely on route C. Thus, signal light (127) may also be indicated as safe to proceed forward on route C or turn right.

Alternatively, if it is determined that the mass transit vehicle in the MTL (109) is proceeding forward, the decision may be made to make no change to the signal light state because there is no right turn across traffic which must be protected.

In another exemplary embodiment, the decision may be to allow light vehicle traffic in light vehicle lane (127) to turn left. In such an example, rail traffic in lane (109) would be stopped, as would vehicular traffic in lane (131). In this example, signal lights (123) and (125) are both red, prohibiting both forward movement and right turns, but signal light (127) is green, including indicating a left green arrow, indicating to light vehicle riders that they have the right-of-way to make a left turn through the intersection (107). Again, it goes without saying that cross traffic would be stopped.

FIG. 4 provides for a similar arrangement to FIG. 3 but utilizes a dedicated MTL (109) where there is only mass transit vehicles. This scenario a dedicated light (122) is provided for the MTL (109). An advantage of this system is that there is no possibility of a vehicle being ahead of the mass transit vehicle in the MTL (109). Further, in the depicted embodiment, the MTL (109) forces the mass transit vehicle to only go right in this intersection (207). This light (122) need only have the options of green right arrow and off. This light can be disabled unless a mass transit vehicle is detected in zone (133) at which time it may provide for the green right arrow as the initial arrangement with both light (123) and (125) remaining on red disk. Note that as traffic form either lane (131) or (132) can still turn right as the mass transit vehicle does, there is no collision risk presented even if a driver in lane (131) or (132) misunderstood the light's (122) intended meaning.

Regardless of the traffic light arrangement, these PLTs and PRTs are preferential to older systems which could require shutting down all traffic during busy times in all directions at an intersection to deal with a mass transit vehicle (or a light vehicle) that may or may not need to turn in a way that presents a collision risk. To go straight, a mass transit vehicle needs only stop cross traffic, but same and opposite direction traffic may continue flowing. In any such embodiment using a centralized control system, the mass transit vehicle routes may be timed in conjunction with expected arrival or departure time between stops, and the signal lights will be timed accordingly to allow mass transit vehicles to remain on a predicted schedule for the reasons discussed above.

In some preferred embodiments using a centralized control system, signals will be controlled to fit particular routes for mass transit vehicles that have multiple track change opportunities and turn options. This embodiment allows for multiple scheduled mass transit vehicles that can utilize the same tracks, but at the same times of day are set to go certain and possible different ways. For example, the mass transit vehicles may always make a PRT on weekdays between 5 am and 12 pm for more efficient service but would go straight at all other times, to accommodate the heaviest commuter routes.

In another embodiment, a mass transit vehicle may not run in conjunction with a centralized system setting lights and times, but may operate on a mass transit vehicle-by-mass transit vehicle basis at each intersection to determine the light settings. By using the system and methods described herein, the mass transit vehicle will have access to any direction through its protected lane. Upon entering the detection zone (133) at the intersection of zone (135) leading to an intersection, the mass transit vehicle operator may, though the mass transit vehicle's computer equipment, send signals and communicate its desired direction to the signal antenna, which will then set the lights accordingly to facilitate safe travel in any direction—straight, PLT, or PRT. A system whereby the signals make independent decisions is generally preferred if there is no central control system and where the individual signals make their own determinations.

In another embodiment, a mass transit vehicle will need to cross over same-direction traffic not at an intersection, but at a designated passenger pick up or drop off location, and then reenter its MTL thereafter. The systems and methods described herein can allow the mass transit vehicle to safely merge into and out of same-direction traffic for this or other purposes using the same signal technology. Further, the system and methods described herein could also be used for any intersection configuration, and is not limited to the 4-side 4-way intersection depicted, and for any number of MTLs or tracks that mass transit vehicles may be traveling along or in, and from any position in the road, whether the MTL is in the middle, as described in the preferred embodiment above, or in any other position amongst the traffic.

In an embodiment, light vehicle operators would have an opportunity to utilize an application-based software component where riders in a determined number, if present at an unfavorable intersection signal, could request and change the signal to allow for a PRT or PLT from a designated lane. This embodiment could be accomplished through several methods, but in the preferred embodiment would be through an automatically activated location-based application that determines the frequency of which cyclists, on a predetermined route, need protected turns based on travel density and time of day.

The software application for bicyclists is installed on the mobile communications device (cell phone, tablet, pad, Fitbit or any other personal carry item that may load applications and determine location) for the purpose of determining the individual bicyclist's global position and direction of travel, and transmitting this information to the central control server or other hardware used to receive this information and forward it to the central control server.

In another embodiment, bicyclists could request PRTs and PLTs from standalone sensors or other button features installed with minimal difficulty at any intersection. Upon approaching an intersection with multiple directions of travel, a bicycle needing to turn across at least one direction of travel in a designated lane safely could trigger a signal change by pressing a button. In some embodiments, more presses would equate to a faster signal change. The signal change time would also be in part governed by other pre-set signal time constraints depending on time of day.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "rectangular" are purely geometric constructs and no real-world component is a true "rectangular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric or other meaning of the term in view of these and other considerations.

The invention claimed is:

1. A system for controlling traffic within a traffic grid, the system comprising:

a traffic grid including a first roadway and a second roadway, the second roadway crossing the first roadway at an intersection;

a first transit lane included within the first roadway, a second transit lane included within the first roadway, wherein traffic in the first transit lane and traffic in the second transit lane are travelling in the same direction; and wherein traffic in the first transit lane turning a first direction through the intersection and onto the second roadway will intersect the route of traffic in the second transit lane traveling straight through the intersection;

a first signal light proximate to the intersection configured to control traffic in the first transit lane traveling into the intersection;

a second signal light proximate to the intersection configured to control traffic in the second transit lane traveling into the intersection, the first signal light and second signal light being controlled by a controller; and a detector configured to detect the presence of a target vehicle within a detection zone in the first transit lane;

wherein the controller alters the first signal light and the second signal light from a first mode of operation where traffic in both the first transit lane and the second transit lane is instructed to proceed straight through the intersection to a second mode of operation where traffic in the first transit lane is instructed to turn the first direction and proceed straight into the intersection and traffic in the second transit lane is instructed to remain stopped if the target vehicle is detected by the detector within the detection zone.

2. The system of claim 1, further comprising:

a third transit lane included within the first roadway;

wherein traffic in the third transit lane is travelling in the same direction as traffic in the first transit lane and the second transit lane;

wherein traffic in the second transit lane turning the first direction through the intersection and onto the second roadway will intersect the route of traffic in the third transit lane traveling straight through the intersection; and wherein traffic in the third transit lane turning a second direction opposing the first direction through the intersection and onto the second roadway will intersect the route of traffic in the second transit lane traveling straight through the intersection and the route of traffic in the first transit lane traveling straight through the intersection; and a third signal light proximate to the intersection configured to control traffic in the third transit lane traveling into the intersection, the third signal light also being controlled by the controller;

wherein the controller in the first mode of operation also instructs traffic in the third transit lane to turn the first direction and proceed straight into the intersection and in the second mode of operation instructs traffic in the third transit lane only to turn in the first direction.

3. The system of claim 1, wherein the target vehicle is a mass transit vehicle.

4. The system of claim 3, wherein the mass transit vehicle is a train.

5. The system of claim 3, wherein the mass transit vehicle is a bus.

6. The system of claim 3, wherein the target vehicle is a bicycle.

7. The system of claim 1, wherein the target vehicle is autonomous.

8. The system of claim 1 wherein the target vehicle is the target vehicle because of its type and the time of day.

9. The system of claim 1 wherein the target vehicle is the target vehicle because it is following a fixed route.

10. The system of claim 1, further comprising a database including at least one predetermined schedule for the target vehicle, and wherein the controller additionally controls the signal light to operate in the default mode of operation or in the alternate mode of operation based on the at least one predetermined schedule of the target vehicle.

11. The system of claim 1, further comprising a VCU within the target vehicle; and wherein the target vehicle is detected by the detector within the detection zone by detection of the VCU within the detection zone.

* * * * *